Figures 1, 2, 3, 4, 5, 6:
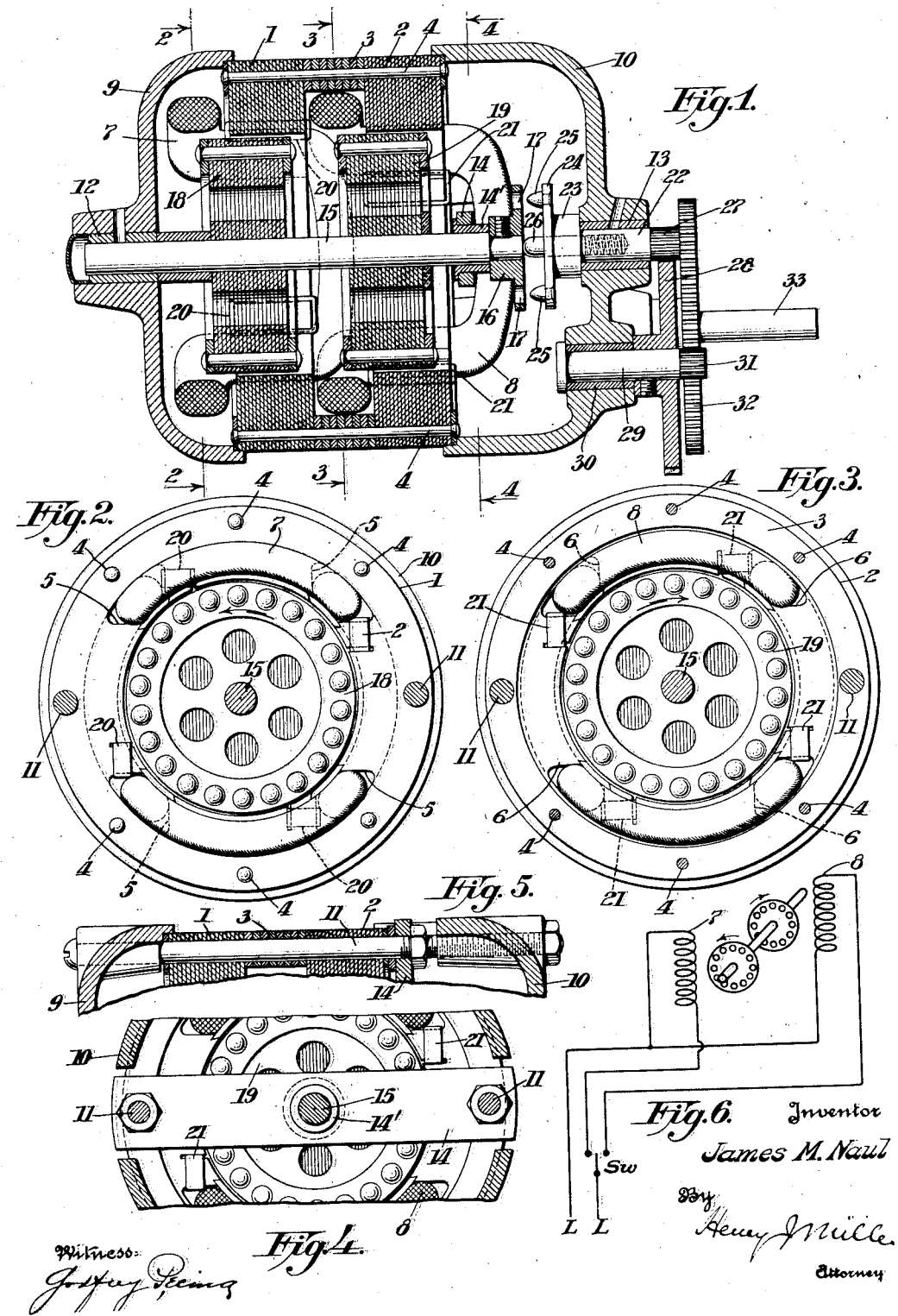

April 24, 1934.  J. M. NAUL  1,956,041

ELECTRIC MOTOR

Filed Jan. 27, 1932

Inventor
James M. Naul
By
Henry J. Miller
Attorney

Patented Apr. 24, 1934

1,956,041

UNITED STATES PATENT OFFICE 1,956,041

ELECTRIC MOTOR

James M. Naul, Fanwood, N. J., assignor to Diehl Manufacturing Company, Elizabeth, N. J., a corporation of New Jersey Application January 27, 1932, Serial No. 589,132

2 Claims. (Cl. 172—120)

This invention relates to electric motors and has for an object to provide a motor of simplified construction which is reversible and is particularly adapted for remote control.

Another object of the invention is to provide a motor with simplified and improved means, preferably enclosed within the motor end-bonnets, for insuring that the magnetically influenced rotor of the motor is connected to the motor output shaft only when the motor is electrically energized.

With the above and other objects in view, as will hereinafter appear, the invention comprises the devices, combinations, and arrangements of parts hereinafter set forth and illustrated in the accompanying drawing of a preferred embodiment of the invention, from which the several features of the invention and the advantages attained thereby will be readily understood by those skilled in the art.

Fig. 1 is a longitudinal section through a motor embodying the invention. Fig. 2 is a section on the line 2—2, Fig. 1. Fig. 3 is a section on the line 3—3, Fig. 1. Fig. 4 is a section on the line 4—4, Fig. 1. Fig. 5 is a fragmentary longitudinal section in a plane 90° from the plane of the section shown in Fig. 1, and Fig. 6 is a diagram of connections illustrating the switching arrangement for controlling the motor from a remote point.

1 and 2 represent laminated coaxial field ring structures which are spaced apart by the separators 3 and held in rigidly assembled relation by rivets 4. The field rings 1 and 2 present inwardly directed poles 5 and 6, respectively, there being four poles for each field ring. The poles 5 of field 1 may be energized by an exciting winding of any usual form, such as the single-phase wave-winding 7. The poles 6 of field 2 may be similarly energized by the single-phase wave-winding 8. The windings 7 and 8 may be connected selectively to an alternating current supply line L, L through a single-pole double-throw switch Sw, as indicated in Fig. 6.

Closing the ends of the field ring assembly 1, 2, are the end-bonnets 9, 10, held together by the usual bolts 11 and having coaxial or alined shaft-bearings 12, 13. Disposed within the end-bonnet 10 and bolted to the field ring assembly, 1, 2, is a diameter bar 14 carrying a shaft bearing bushing 14' intermediate and alined with the bearings 12 and 13.

Journaled in the bearings 12 and 14', with freedom for endwise movement, is the motor-shaft 15 to one end of which is secured, between the bearings 13 and 14, the clutch-plate 16 having a pair of diametrically opposed apertures 17.

The motor-shaft 15 carries two induction or squirrel-cage rotors 18, 19 which are spaced apart on the shaft 15 a distance equal to the space between the field rings 1 and 2; each rotor being within the zone of influence of a respective field ring. A set of shading coils 20 is applied to the poles 5 of field ring 1 to provide a rotating magnetic field characteristic causing the rotor 18 and shaft 15 to turn in a counter-clockwise direction, Fig. 2. Another set of shading coils 21 is applied to the poles 6 of the field ring 2 to provide an oppositely rotating magnetic field characteristic causing the rotor 19 and shaft 15 to turn in a clockwise direction, Fig. 3.

Journaled in the bearing 13 of the end-bonnet 10 is a driven or motor output shaft 22 having at its inner end a collar 23 formed with a disk-face 24 from which protrude the rounded diametrically opposed pins 25 adapted to be engaged by the walls of the apertures 17 in the clutch-plate 16. Slidably fitted in the inner end of the shaft 22 is a spring-pressed plunger 26 the rounded end of which is in engagement with the adjacent end of the shaft 15. When the motor is not energized the plunger 26 effects endwise movement of the motor shaft 15 to disconnect the clutch-disk 16 from the pins 25. When either of the fields 1 and 2 is energized it will draw its respective rotor sidewise into coincidence with it and thereby overcome the force of the plunger 26 and effect the connection of the shaft 15 to the output shaft 22.

The shaft 22 may carry a pinion 27 meshing with a gear 28 fixed to the shaft 29 journaled in the bearing 30 in the end-bonnet 10. The shaft 29 may be formed with a pinion 31 meshing with the gear 32 on the slow-speed shaft 33 which may be coupled, for example, to a radio tuning condenser for the remote control of the latter. By arranging the switch Sw at a distance from a radio receiving set having the present motor incorporated therein, it will be obvious that by manipulating such switch, the usual tuning device or condenser may be slowly turned in either direction to select any desired station. As the motor is of the sparkless or induction type, there will be no radio interference set up by its operation. Many other uses for a motor of the present construction and mode of operation will be obvious and need not be herein dwelt upon.

Having thus set forth the nature of the invention, what I claim herein is:—

1. An electric motor having a laminated field ring structure, end-bonnets closing the ends of said field ring structure and having coaxial shaft bearings, an intermediate bearing supported coaxially between the end-bonnet shaft-bearings, a driven shaft journaled in one of said end-bonnet shaft-bearings, a motor-shaft journaled in said intermediate bearing and in the other end-bonnet shaft-bearing coaxially with the driven shaft, and a clutch connection between said shafts and within the driven-shaft-supporting end-bonnet engageable and disengageable by endwise movement of said motor-shaft.

2. An alternating current electric motor having a pair of coaxial laminated field-core rings, spacing means interposed between said rings, separate energizing windings for said rings arranged to produce oppositely rotating magnetic fields therein, shaft-bearing members secured to the outer ends of said rings, a motor-shaft journaled in said bearings, a pair of induction rotors carried by said shaft between said bearings and spaced apart to register each with a respective one of said field-core rings, a third bearing member secured to the outer end of one of said rings, a driven shaft journaled in said third bearing member, a clutch-connection between said shafts engageable and disengageable by endwise movement of said motor-shaft, and means for selectively energizing said windings at the will of the operator.

JAMES M. NAUL.